(12) United States Patent
Valluri et al.

(10) Patent No.: US 7,898,949 B2
(45) Date of Patent: Mar. 1, 2011

(54) BROWNOUT DETECTION

(75) Inventors: Vamsidhar Valluri, Fremont, CA (US); Martin Djernaes, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 11/092,425

(22) Filed: Mar. 29, 2005

(65) Prior Publication Data

US 2006/0221812 A1    Oct. 5, 2006

(51) Int. Cl.
    *G01R 8/31* (2006.01)
(52) U.S. Cl. .................................. 370/230.1; 370/235
(58) Field of Classification Search ............. 370/216, 370/230.1, 235
    See application file for complete search history.

(56) References Cited

U.S. PATENT DOCUMENTS

| | | | |
|---|---|---|---|
| 6,594,305 B1 | 7/2003 | Roeck et al. | |
| 6,662,223 B1 | 12/2003 | Zhang et al. | |
| 6,836,800 B1 * | 12/2004 | Sweet et al. | 709/224 |
| 2002/0038360 A1 * | 3/2002 | Andrews et al. | 709/223 |
| 2002/0145981 A1 * | 10/2002 | Klinker et al. | 370/244 |
| 2003/0039007 A1 * | 2/2003 | Ramadas et al. | 359/128 |
| 2003/0086422 A1 * | 5/2003 | Klinker et al. | 370/389 |
| 2003/0133443 A1 * | 7/2003 | Klinker et al. | 370/353 |
| 2004/0221296 A1 * | 11/2004 | Ogielski et al. | 719/313 |
| 2005/0135415 A1 * | 6/2005 | Fan et al. | 370/468 |
| 2005/0165985 A1 * | 7/2005 | Vangal et al. | 710/107 |

OTHER PUBLICATIONS

Zadnik, Martin, Overview of NetFlow Monitoring Adapter, CESNET Technical Report No. 8/2004, Mar. 11, 2004, pp. 1-5.
Rekhter, Y., et al., RFC 1771, entitled A Border Gateway Protocol 4 (BGP-4), Network Working Group, Mar. 1995, pp. 1-54.

* cited by examiner

*Primary Examiner* — Nittaya Juntima
*Assistant Examiner* — Sai-Ming Chan
(74) *Attorney, Agent, or Firm* — Cesari and McKenna, LLP

(57) ABSTRACT

An apparatus and automatic method for detecting brown-outs in a computer network includes determining normal rates of different types of traffic with respect to defined address prefixes. Thresholds are established based on the normal rates. The rates for the different traffic types are monitored, and when a threshold is exceeded the detected addresses and traffic types are flagged for reporting. In some cases, the inventive system will monitor traffic to finer address granularities to further identify suspect addresses. The system may actively ping suspect sub-prefixes and/or initiate communications with the suspect sub-addresses that is then monitored to determine which sub-prefixes are experiencing abnormal activity.

22 Claims, 2 Drawing Sheets

BROWNOUT DETECTION

BACKGROUND OF THE INVENTION

1. Field of the Invention

This invention relates generally to computer networks, and, more particularly, to network reachability problems.

2. Background Information

Data communication in a computer network involves the exchange of data between two or more entities interconnected by communication links, segments and sub-networks. These entities are typically software processes executing on hardware computer platforms, such as end nodes and intermediate nodes. Communication software executing on the end nodes correlate and manage data communication with other end nodes. The nodes typically communicate by exchanging discrete frames or packets of data according to predefined protocols, such as the Transmission Control Protocol/Internet Protocol (TCP/IP).

An intermediate node, such as a router, may interconnect the sub-networks to extend the effective "size" of the computer network. The router executes routing protocols used to direct the transmission of data traffic between the end nodes, such as hosts or users. Typically, the router directs network traffic based on destination address prefixes contained in the packets, i.e., the portions of destination addresses used by the routing protocol to render routing ("next hop") decisions. Examples of such destination addresses include Internet Protocol (IP) version 4 and version 6 addresses. A prefix implies a combination of an IP address and a mask that cooperate to describe an area or range (of addresses) of the network that a router can reach, whereas a route implies a combination of a set of path attributes and a prefix. Much of the following detailed discussion refers to routers that are specific examples of "nodes," but the present invention applies wherever routing occurs.

The infrastructure of a router typically comprises functional components organized as a control plane and a data plane. The control plane includes the components needed to manage the traffic forwarding features of the router. These components include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented on the single processor. However, for some high performance routers, these planes are implemented within separate devices of the intermediate node. For example, the control plane may be implemented in a supervisor processor, whereas the data plane may be implemented within a hardware-assist device, such as a co-processor or a forwarding processor. In other words, the data plane is typically implemented in hardware that is separate from the hardware that implements the control plane.

FIG. 1 is a prior art model of two autonomous systems AS1 and AS2 communicating with each other via routers R1 and R2 using Border Gateway Protocol (BGP). BGP is also know as Exterior Gateway Protocol (EGP). R1 and R2 are "peer" routers, sometimes referred to as "edge" or "border" routers, since they communicate with each other between the autonomous systems. AS1 and AS2 within their autonomous networks may connect to many intermediate network nodes, e.g., end users, hosts, etc. and have many other internal intermediate routers (2, 2', 4, 4') connecting to networks and sub-networks, hosts, etc. Within the autonomous systems, the border routers may communicate via Interior Gateway Protocols (IGP's) as known in the art—R1 and R2 will run both BGP and IGP.

Autonomous systems are network structures, usually complex, that all fall under one administrative authority, such as a company, a branch of government, or an academic institution. In this way the administrative authority can guarantee that the internal routes remain consistent and viable. Typically, as known in the art, the administrative authority will designate one router, a border router, to advertise or inform the outside world of the autonomous system's "reachability"—those destination network addresses entirely within the autonomous system.

It is axiomatic that the reachability information carried by the protocols through the network reflect the current state of the last hop router, and the reachability information is propagated in such a way that the receiving routers will know how to reach the last hop router—the router that directly connects to a destination address. In the present discussion below a 32 bit IP version 4 address is used but other addressing schemes may be used with the present invention.

Unfortunately the routing protocols stored in the routing nodes may not have the correct information. This can be due to hardware/software/firmware problems along the network path to and including the last hop router. It can also be due to human error and to incorrect or bad policies along the network.

Hardware/software problems are straight forward. Examples are a fiber link that is marginally conducting light, some integrated circuit or connector malfunction, corrupted software, operating timeouts, looping, excessive delays, insufficient memory, etc. One very real practical example is a Denial Of Service (DOS) attack. In such an attack the routing information and the links operate properly but packets cannot be forwarded or are forwarded with significant delays all due to the link being saturated with traffic. Packets are routinely dropped although the system is functioning.

Human error may be an administrator or other user redistributing a static route into a routing protocol that points to a non-existing destination.

Policy problems include, for example, an Internet Service Provider (ISP) that limits or otherwise restricts inbound traffic to its customers. For example, an ISP may only allow a subscriber one hour of access to some information, and when the limit is reached the ISP will stop routing the traffic to the subscriber. In this case the routing and network paths are intact but the information is not reaching its intended destination. In other cases, an entity may restrict access to prefix areas containing confidential or important data.

In the present application the term "brown-out" refers to a sub-set of prefixes advertised by a router that are not reliably reachable. A "black-out" is the limiting case where all of the prefixes are unreachable.

When a "brown-out" occurs, often a customer will call his ISP and complain. A service person at the ISP will then, at a console, manually try to find some alternative route and/or identify the suspect addresses and the type of problem. Typically, the person "pings" or tries to interrogate specific addresses to see if they are reachable until he finds those that are unreachable. "Pinging" might denote trying to establish a TCP session with the suspect addresses. Such a scenario is a problem that service providers would wish to not happen. First, the customer is not happy, and, second, the manual detection and the correction may take some time.

The present invention is directed to automatically detecting brown-outs and notifying an administrator or some controlling entity of a specific problem at specific addresses. In the best case, the problem is corrected before any customer complains and without manual intervention to detect the problem locations. The administrator will then take corrective action. The efficiency of the system and public relations are improved—the customer may not be aware of any problem.

SUMMARY OF THE INVENTION

The present invention includes automatic detection of brown-outs by detecting abnormalities in traffic patterns for a given prefix or a sub-set of a prefix. In a preferred embodiment, after the detection of abnormalities, the present invention may automatically act to narrow the range of suspect sub-prefixes.

Since traffic abnormalities are being detected, a baseline is established and some threshold determined that is indicative of an abnormality. A router acting as a forwarding device can passively monitor the traffic passing through the router. Moreover, virtually any router or host may include a "helper" processing system that may send "specialized traffic" to measure or provoke a detection of traffic patterns and problems. The helper processing system, associated with or part of the router, then can build a history based on this information and use that history to detect if a prefix, or a subset of the prefix, is experiencing an abnormal change in its traffic pattern. When detected, the helper processing system can then identify the prefix or subset thereof as having a "brown-out" condition and notify an administrator and/or any consumer process client of this technology with specific information so appropriate action is taken.

In an illustrative embodiment, the "specialized traffic" may include the "pinging" described above but may also include initiating communications between the helper processing system and a suspect known host. The system may then monitor that traffic and detect "brown-out" conditions.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 2:
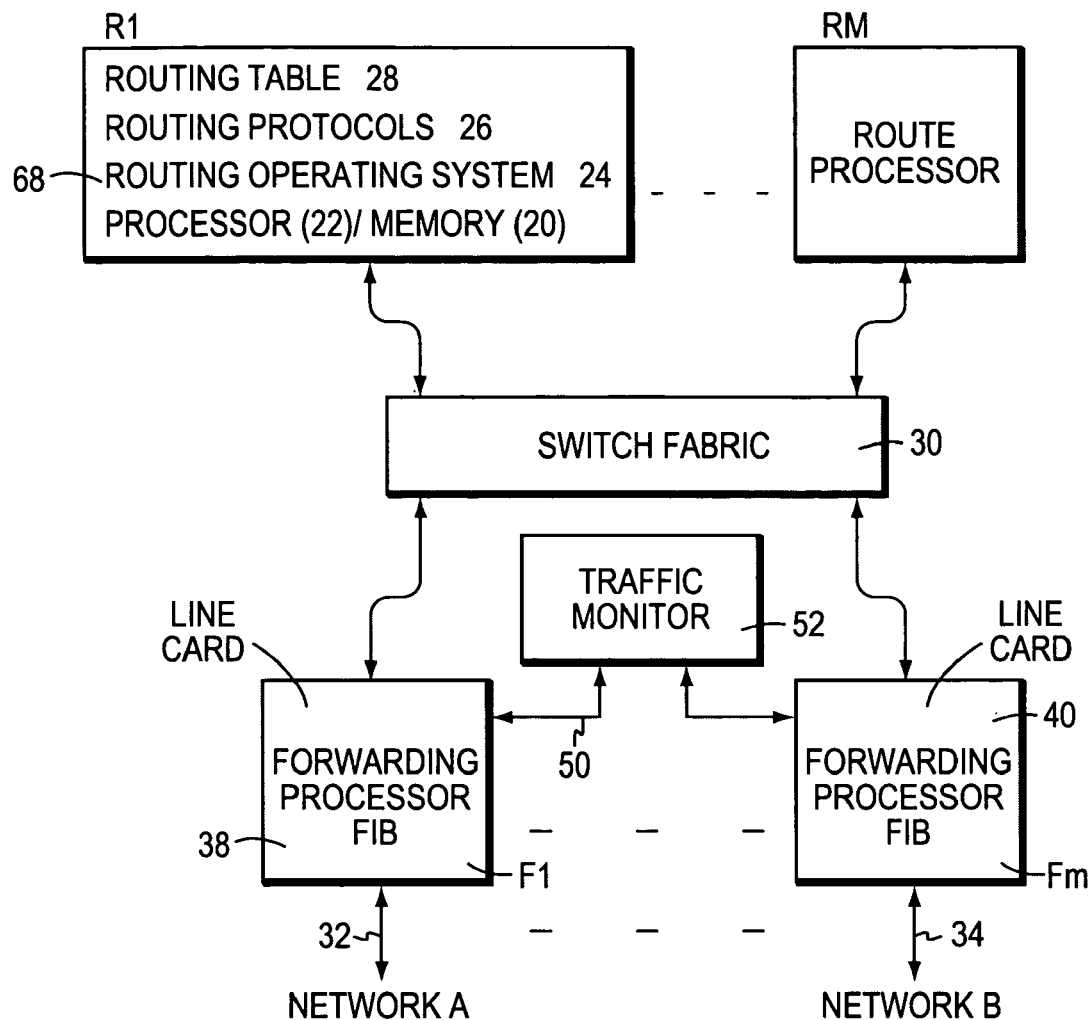
FIG. 2 is a block diagram schematic of a generic router system incorporating the present invention.
Figure 1:
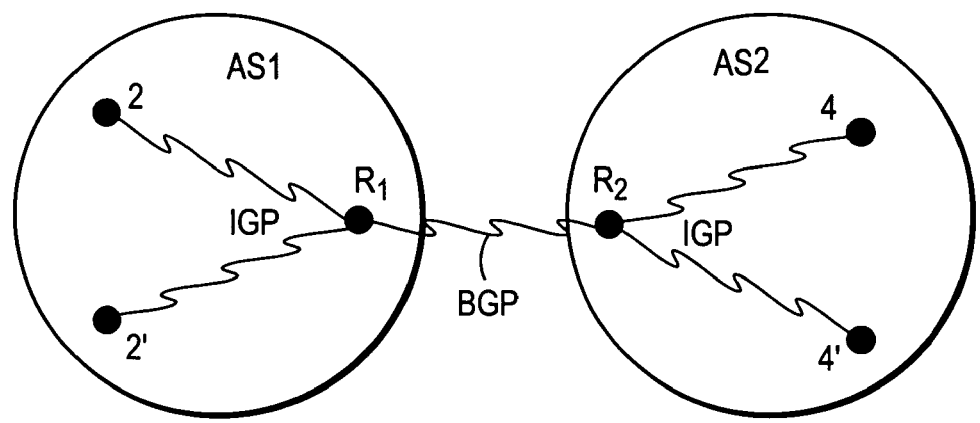
FIG. 1 is block diagram of a prior art system.

FIG. 2 is a generic block diagram illustrating major functions and hardware in a router system that may employ the present invention. In this case the router may be an edge or border router or an internal router. The platform(s) used may be virtually any as known to those skilled in the art. The memory 20 is typically a RAM (of virtually any type, static, dynamic, etc.) containing locations that are addressable by the processor 22. The memory 20 may even be remote from the processor.

The memory 20 contains, inter alia, a routing operating system 24 that organizes and implements the routing of information traffic, typically packets, through the router of FIG. 2. Particular routing protocols 26 are stored for use by the routing operating system. These protocols may be interior routing gateways (IGP) and border routing gateways (BGP). Routing information is stored in a routing table 28. In general packets are received from a network, say Network A, and the operating system 24 finds a forwarding route based on the contents of the routing table 28. The proper protocol is provided by the operating system and the packet is forwarded. The IOS (trademark) operating system by Cisco Technology Incorporated is an example of an operating system 24 that may be used in accordance with this illustrative embodiment. The route processors 22 may comprise processing elements or logic for executing the software programs and manipulating the data structures. The router operating system 24, portions of which are typically resident in memory and executed by the processor, functionally organizes the router by, inter alia, invoking network operations in support of software processes executing on the processors. It will be apparent to those skilled in the art that other processor and memory means, including various computer readable media, may be used for storing and executing program instructions pertaining to the inventive techniques described herein.

The route processors R1, Rm may comprise a plurality of loosely coupled route processors connected to a plurality of forwarding processors F1, Fm that input (Rx) and output (Tx) messages to other networks. Each route processor system, preferably comprises at least one central processing unit (CPU), e.g., the Power-PC 7460 chip. The CPU is adapted to run a single copy of the router operating system 24 and access its memory space 20. The route processors and the forwarding processors are joined by an interconnect fabric 30 such as, e.g., a crossbar interconnection switch or high-speed bus. Those skilled in the art will recognize that other router platforms such as, e.g., a uniprocessor system or a plurality of independent processor nodes interconnected via a communications fabric as a multi-node cluster, could be used in accordance with the invention. The term "node," defined above, further denotes a computer or processor complex comprising processors and an independent memory shared by the processors.

Each connection 32, 34 connects to neighboring network nodes where information is sent and received. In the present case the neighboring nodes may include both "peer" routers in adjacent autonomous networks and internal nodes 2, 2' within an autonomous system. In other cases the forwarding processors F1, Fm may be adapted to transfer data packets from various data links, e.g., Ethernet, optical links, etc. Furthermore the various connections may use a variety of protocols, e.g. ATM (asynchronous transfer mode), FDDI (fiber distributed data interface), etc. However, in the present case we shall discuss the preferred embodiments with respect to peer router to peer router connections, although the present invention may be used advantageously communicating to all nodes within autonomous systems.

As used herein, a route comprises, inter alia, a combination of a set of path attributes and a prefix. The routing protocols, such as the Border Gateway Protocol version 4 (BGP) or Interior gateway Protocols (IGP) may be invoked for information transferring to exterior autonomous networks and to interior networks, respectively. BGP is an inter-domain routing protocol used for inter-domain routing (for the Internetwork layer) through the computer network. The neighboring routers (hereinafter "neighbors") exchange routing and network layer reachability information (NLRI) among autonomous systems over a reliable transport layer connection, such as TCP. An adjacency is a relationship formed between selected neighbors for the purpose of exchanging routing messages and abstracting the network topology. A BGP routing protocol standard (BGPversion 4) is well known and described in *Request For Comments* (RFC) 1771, by Y. Rekhter and T. Li (1995), which is hereby incorporated herein by reference.

In the illustrative embodiment, the router operating system 24 implements separate software process modules that are distributed over active route processors 22, and line cards 38, 40. Operationally, the router builds the routing tables 28 after exchanging routing information with the neighbors. The routing processors 22 facilitate communication between the various components, i.e., the routing tables and the routing protocols. The routing table 28 provides information to the Forwarding Information Base (FIB) on the line cards 38, 40. The information describes how to forward data packets through the router.

The line cards 38, 40 perform forwarding of the data traffic, while the route processors 22 handle routing and control of the data traffic forwarding. The forwarding processors on the line cards render a forwarding decision for each packet received at a port and determine where to forward the packet.

Figure 3:
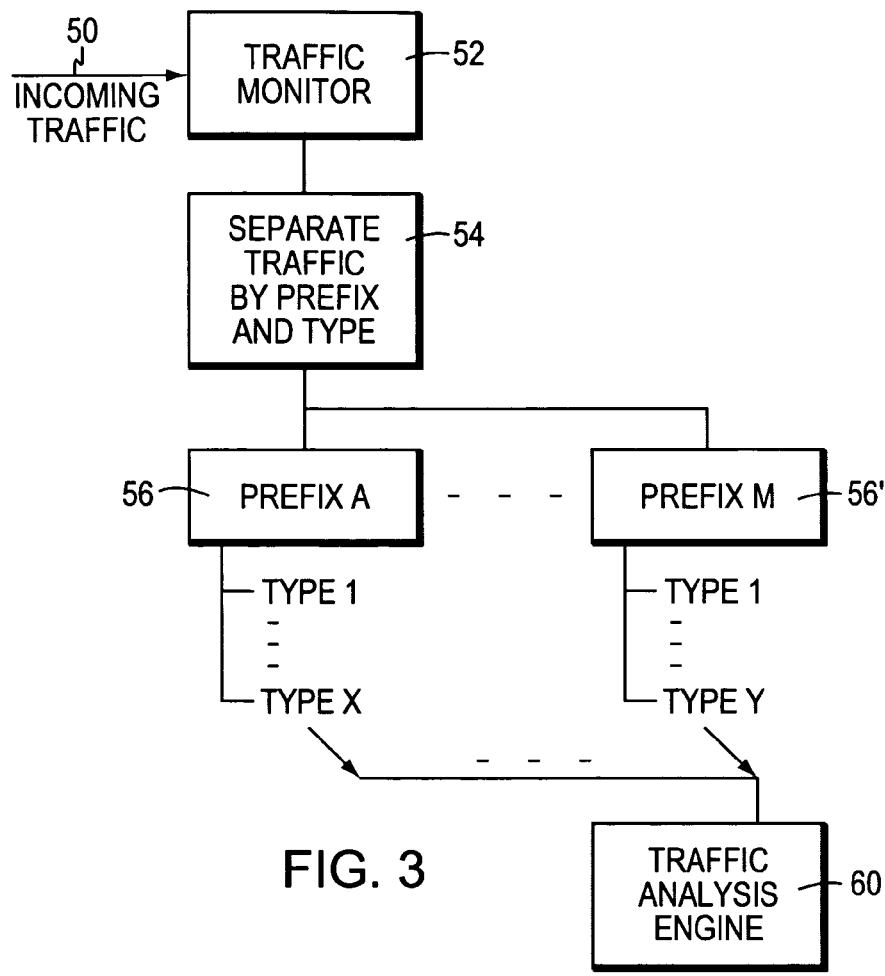
FIG. 3 is a block diagram of a preferred embodiment of the invention.
Figure 4:
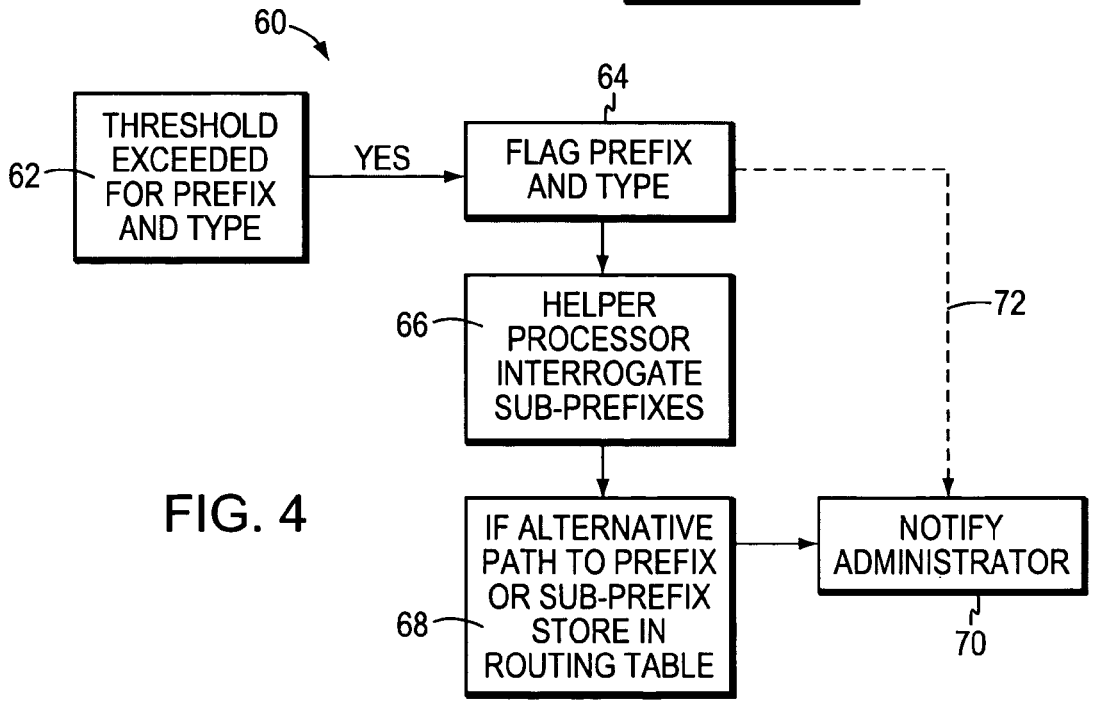
FIG. 4 is a block diagram of the Analysis Engine of FIG. 3.

An overview of FIGS. 3 and 4 is followed below by a more detailed description. FIG. 3 illustrates a preferred embodiment of system functions illustrating the present invention. These functions will typically be configured within a router. The incoming traffic 50 received by a router is monitored 52, classified as to address prefix and type 54, and stored in buckets 56, 56' according to the address prefix and type. A traffic analysis engine 60 may periodically interrogate the buckets, but in other embodiments other triggers, as known to those skilled in the art, may be used. FIG. 4 illustrates functions within the analysis engine 60. Previously determined thresholds are stored and when exceeded 62 due to an abnormal occurrence, the particular prefix bucket and type are flagged 64. Appropriate action is then taken where some authority is notified 70, and in some instances further action is performed on sub-prefixes (of the suspect prefix) to further isolate the problem addresses. In any event, the prefix and type of traffic instance is stored and an administrator and/or a consumer process client of this technology are notified so that appropriate action may be taken.

As shown in FIG. 3, the traffic monitor 52 separates the traffic by prefix and type 54. Virtually any predictable traffic pattern may be a type and used to advantage with the present invention. For example, the TCP (transfer control protocol) is a well known protocol in use throughout the Internet. When a TCP session is established, there is a well known three-way handshake. In a simple form a message with the SYN bit is sent from one site to another. There is a return message with both the SYN and the ACK bits set acknowledging receipt of the initial message. The initiator then returns an ACK to indicate both sites agree that a connection has been established. In operation with the present invention the rate (number over time) of completed three-way handshakes for a given prefix is one type of traffic that may be used with the present invention.

Another routine predictable traffic pattern includes TCP segment ordering. This is a measure of receipt of out-of-order segments. If a segment is lost it must be re-transmitted, and the rate of such re-transmissions is a "quality" indicator of the path from one site to another. For example, often sliding "windows" are used to transmit packet streams. Rather than waiting for acknowledgement of each packet, a sequence of packets are sent. The sequence constitutes the "window." As acknowledgments are received the window slides to include new packets. But if a packet is delayed too long and no acknowledgment is received, that packet must be re-transmitted. This occurrence often will require that the operating system reduce the window size making it more inefficient. The rate of out-of-order packets may be established as another type of traffic.

A third type of traffic pattern that may be useful with the present invention is the data rate. A change in the rate of data transfer to a particular prefix may be used as an indicator of a problem within the prefix.

Other types of traffic patterns that may be useful with the present invention are: the delays and jitter. Delay would include end-to-end and round trip measurements. Jitter is the "burstiness" of the packets or variations in the inter-packet time gaps of packets to a prefix. Delay and/or jitter often indicate problems along the path from one site to another.

The above examples of types of traffic patterns are well known in the art, and there may very well be other traffic types where changes indicate brown-out conditions that should be reported and/or investigated.

For each of the above types of traffic patterns, a threshold is established heuristically, by using knowledge of those familiar with the particular sites, or by accumulating data on the traffic patterns over time. The threshold indicates an abnormality that probably requires further investigation, and is stored in the Traffic Analysis Engine 60 of FIG. 4.

In operation, referencing FIG. 4, a threshold 62 is established and stored for each type of traffic pattern in the analysis engine 60. Each threshold may be normalized, inter alia, over particular time periods specific to the traffic and the particular sites. These would be set by a system administrator but could be automatically set as some offset from the initial (normal) rates measured by the traffic monitor over a time period. For example, if a typical rate of TCP terminations were established for traffic to a given prefix, those familiar with the sites may determine that a change of ±2% from that normal rate may indicate an abnormality. The change is used as a threshold and flagged 64 if exceeded. The prefix is then saved as suspect for further action.

When flagged 64 the Analysis Engine may be simply passive and report 72, 70 the suspect prefix and traffic type to an administrator and/or any consumer process client of this technology for further action. In a semi-passive action, the traffic monitor system is arranged with a helper processor 66 that could be arranged to create and place traffic types in buckets with a finer address granularity. For example, if the original prefix detected as having a problem was 16 bits, the system might rearrange the buckets as address groups of more than 16 bits (of the 32 bit IP address), say 8 more bits. In this case, the traffic types, in the sub-prefixes of the original prefix, can be accumulated in buckets 56 and monitored. The abnormality will be associated with some group of the sub-prefixes, and the suspect sub-prefixes reported.

However, if flagged, the present invention may be arranged as pro-active 68 to furhther determine sub-prefixes demonstrating the problem. In this case, the Analysis Engine with use of the helper processor 66 may initiate transfers to sub-prefixes to provoke a detection of the problem traffic pattern in the sub-prefixes, and thereby narrows the range of addresses that need to be further investigated. For example, consider that a prefix of 16 bits is detected as having a rate of TCP sessions established that exceeds the threshold. An illustrative embodiment of the present invention may be arranged to initiate TCP session establishments, by sending out packets with the SYN bit set to a sub-set of the prefix addresses to 24 or more bits to find the sub-prefixes (of the 16 bit addresses) where the problem exists. As will be known to those skilled in the art, other types of messages may be used to test prefixes and/or sub-prefixes of suspect addresses.

In a semi-passive or active system the granularity may be tailored for particular applications, and extending the address prefix granularity, say to 25, 26, or more bits may be advantageous.

Furthermore, if an alternative routes, e.g., a back-up or repair route, were known for a destination address exhibiting an abnormality, the Analysis Engine may re-route 68 traffic by updating the routing tables with the alternative route while informing an administrator or other such controller of the problem path.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   establishing a first bucket associated with an address prefix;
   establishing a baseline associated with the first bucket and indicative of a normal traffic pattern with the address prefix;
   establishing a threshold indicative of an abnormal change from the baseline;
   monitoring, by a traffic monitor of a network node, a traffic pattern with the address prefix;
   comparing the monitored traffic pattern to the threshold; and
   in response to the threshold being exceeded
      creating a plurality of second buckets that are each associated with a different sub-prefix of the address prefix, wherein the second buckets each have a finer address granularity than the first bucket,
      monitoring, by the traffic monitor, the traffic pattern to each sub-prefix associated with a second bucket,
      identifying one or more particular sub-prefixes as experiencing an abnormal change, and
      generating a notification of a suspected brown-out condition associated with the one or more particular sub-prefixes.

2. The method of claim 1 wherein the traffic pattern is completed three-way handshakes, and the monitoring a traffic pattern with the address prefix and the monitoring the traffic pattern to each sub-prefix, monitor a rate of completed three-way handshakes.

3. The method of claim 1 wherein the traffic pattern is out-of-order packets, and the monitoring a traffic pattern with the address prefix and the monitoring the traffic pattern to each sub-prefix, monitor a rate of out-of-order packets.

4. The method of claim 1 wherein the traffic pattern is data transfer, and the monitoring a traffic pattern with the address prefix and the monitoring the traffic pattern to each sub-prefix, monitor a rate of data transfer.

5. The method of claim 1 further comprising:
   sending one or more packets to provoke the traffic pattern.

6. The method of claim 5 wherein the traffic pattern is completed three-way handshakes the one or more packets are packets with a SYN bit set.

7. The method of claim 1 further comprising:
   in response to identifying the one or more particular sub-prefixes as experiencing an abnormal change, rerouting traffic directed to the one or more particular sub-prefixes to use an alternative route.

8. The method of claim 1 wherein the monitoring a traffic pattern with the address prefix comprises:
   interrogating the first bucket periodically to examine the traffic pattern with the address prefix.

9. The method of claim 1 wherein the monitoring a traffic pattern with the address prefix comprises:
   interrogating the first bucket in response to a trigger to examine the traffic pattern with the address prefix.

10. The method of claim 1 wherein the establishing a baseline associated with the first bucket and indicative of a normal traffic pattern with the address prefix further comprises:
    measuring traffic with the address prefix over an initial period of time to build a history, and basing the baseline on the history.

11. An apparatus comprising:
    a processor;
    at least one network interface; and
    a memory storing instructions that are executable by the processor, the instructions, when executed, to establish a first bucket associated with an address prefix, establish a baseline associated with the first bucket and indicative of a normal traffic pattern with the address prefix, establish a threshold indicative of an abnormal change from the baseline, monitor a traffic pattern with the address prefix, compare the monitored traffic pattern to the threshold, and in response to the threshold being exceeded, create a plurality of second buckets that are each associated with a different sub-prefix of the address prefix, wherein the second buckets each have a finer address granularity than the first bucket, monitor the traffic pattern to each sub-prefix associated with a second bucket, identify one or more particular sub-prefixes as experiencing an abnormal change, and generate a notification of a suspected condition associated with the one or more particular sub-prefixes.

12. The apparatus of claim 11 wherein the traffic pattern is completed three-way handshakes, and the instructions that, when executed, monitor a traffic pattern with the address prefix and the instructions that, when executed, monitor the traffic pattern to each sub-prefix, monitor a rate of completed three-way handshakes.

13. The apparatus of claim 11 wherein the traffic pattern is out-of-order packets, and the instructions that, when executed, monitor a traffic pattern with the address prefix and the instructions that, when executed, monitor the traffic pattern to each sub-prefix, monitor a rate of out-of-order packets.

14. The apparatus of claim 11 wherein the traffic pattern is data transfer, and the instructions that, when executed, monitor a traffic pattern with the address prefix and the instructions that, when executed, monitor the traffic pattern to each sub-prefix, monitor a rate of data transfer.

15. The apparatus of claim 11 further comprising instructions that, when executed, send one or more packets over the network interface to provoke the traffic pattern.

16. The apparatus of claim 15 wherein the traffic pattern is completed three-way handshakes the one or more packets are packets with a SYN bit set.

17. The apparatus of claim 11 further comprising instructions that, when executed, reroute traffic directed to the one or more particular sub-prefixes to use an alternative route.

18. The apparatus of claim 11 wherein the instructions that, when executed, monitor a traffic pattern with the address prefix further comprise instructions to interrogate the first bucket periodically to examine the traffic pattern with the address prefix.

19. The apparatus of claim 11 wherein the instructions that, when executed, monitor a traffic pattern with the address prefix further comprise instructions to interrogate the first bucket in response to a trigger to examine the traffic pattern with the address prefix.

20. The apparatus of claim 11 wherein the instructions that, when executed, establish a baseline associated with the first bucket and indicative of a normal traffic pattern with the address prefix further comprise instructions to measure traffic with the address prefix over an initial period of time to build a history, and to base the baseline on the history.

21. The apparatus of claim 11 wherein the suspected condition is a suspected brown-out condition.

22. An apparatus comprising:
a processor;
means for establishing a first bucket associated with an address prefix;
means for establishing a baseline associated with the first bucket and indicative of a normal traffic pattern with the address prefix;
means for establishing a threshold indicative of an abnormal change from the baseline;
means for monitoring a traffic pattern with the address prefix;
means for comparing the monitored traffic pattern to the threshold; and
means for, in response to the threshold being exceeded, creating a second bucket that is associated with a sub-prefix of the address prefix, wherein the second bucket has a finer address granularity than the first bucket, monitoring the traffic pattern to the sub-prefix associated with the second bucket, identifying a particular sub-prefix as experiencing an abnormal change, and generating a notification of a suspected condition associated with the particular sub-prefix.

* * * * *